No. 760,751. PATENTED MAY 24, 1904.
W. H. OGDEN.
ATTACHMENT FOR LAWN MOWERS.
APPLICATION FILED JAN. 9, 1904.
NO MODEL.
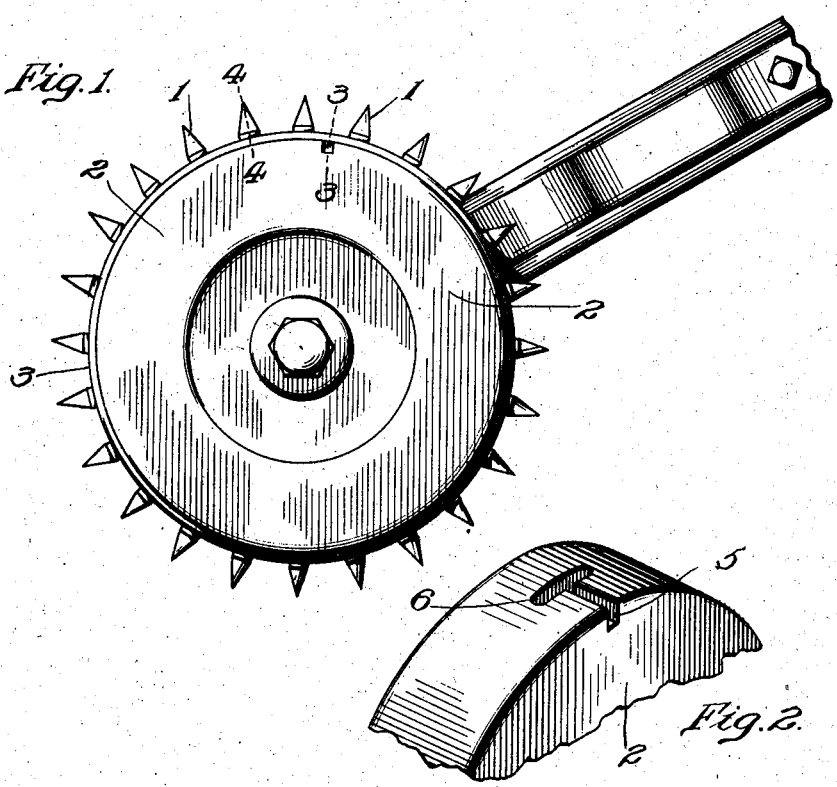
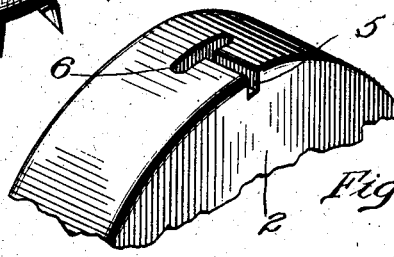
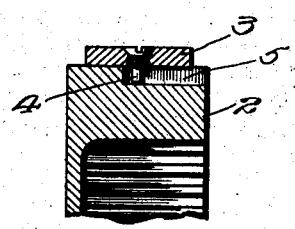
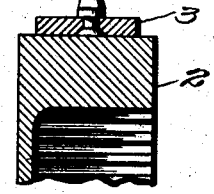
WITNESSES:
INVENTOR
William H. Ogden.
BY
ATTORNEY.

No. 760,751.

Patented May 24, 1904.

UNITED STATES PATENT OFFICE.

WILLIAM H. OGDEN, OF PHILADELPHIA, PENNSYLVANIA.

ATTACHMENT FOR LAWN-MOWERS.

SPECIFICATION forming part of Letters Patent No. 760,751, dated May 24, 1904.

Application filed January 9, 1904. Serial No. 188,331. (No model.)

*To all whom it may concern:*

Be it known that I, WILLIAM H. OGDEN, a citizen of the United States, and a resident of the city and county of Philadelphia, State of Pennsylvania, have invented certain new and useful Improvements in Attachments for Lawn-Mowers, of which the following is a full, clear, and exact description.

This invention relates to improvements in lawn-mowers and the like, and has for its object to provide means to prevent the lawn-mower from slipping when it is being propelled along the side of a hill or terrace, as will be fully described and claimed hereinafter.

In the accompanying drawings, which form a part of this specification and in which similar reference-numerals are used to indicate similar parts, Figure 1 represents a side elevation of a portion of a lawn-mower with my invention applied thereto. Fig. 2 represents a perspective view of a portion of the traction-wheel of a lawn-mower. Fig. 3 represents a sectional view of a portion of a traction-wheel, taken on the line 3 3 of Fig. 1. Fig. 4 represents a sectional view of a portion of a traction-wheel, taken on the line 4 4 of Fig. 1.

A lawn-mower that is being operated along the side of a hill or terrace is liable to slip, which is of course objectionable, and to obviate this objection I provide one of the lawn-mower wheels, or both, with sharp projecting portions that are adapted to enter the turf or soil sufficiently to prevent the lawn-mower from slipping sidewise. In the particular construction illustrated these projections consist of spurs 1 projecting at intervals from the wheel 2 and which it is obvious will enter the soil or turf for the purpose stated. Although these projections that are adapted to enter the soil are especially designed for the purpose of preventing the lawn-mower from slipping on the side of a hill, yet it is obvious that when operating on level ground the projections specifically shown in the drawings would likewise prevent the wheel from slipping should the grass and soil be wet and slippery and would therefore insure the correct operation of the lawn-mower. In some instances, however, it would be undesirable to have these sharpened projections on the lawn-mower—for instance, when it would be transported from place to place over pavements—and for this purpose I make these projections removable, and in the particular instance shown in the drawings, illustrating a preferred embodiment of my invention, these spurs 1 are carried by a member which is conveniently a band or collar 3, as shown in Fig. 4, and which collar 3 is adapted to be removably secured upon the wheel 2. The said collar 3 can of course be secured upon the wheel in various ways to prevent accidental disengagement therefrom, as well as to prevent relative rotary movement, and in the particular instance illustrated the said wheel is provided with a groove or recess 5 in its periphery, at the inner end of which is a transverse socket 6. The projection 4 on the collar enters the groove or recess 5 when the collar is placed upon the wheel, and when in position said projection will enter either of the ends of the socket 6, and thus prevent the rotation of the collar upon the wheel, as well as accidental lateral movement. It is obvious, however, that the collar may be secured in other ways. For instance, if it were made to fit tightly or snugly upon the wheel and to be driven thereon and therefrom sufficient friction might be secured between these parts to hold the collar in place for the purpose intended. Further, the transverse socket 6 might be done away with and the collar and wheel interlocked only for the purpose of preventing relative rotary movement, utilizing the friction between the collar and wheel to prevent lateral movement, and thus it will be seen that when the collar is applied to the wheel the projection 4 is located so that it will enter the groove or recess 5, and then the collar may be moved into position. It has been found in practice that a lawn-mower so equipped on either or both wheels will be prevented from slipping downhill when operated on the side of a hill and will also insure the proper operation of the lawn-mower when operating upon slippery level ground.

Having thus described my invention, what I claim, and desire to protect by Letters Patent of the United States, is—

1. The combination with a lawn-mower wheel, having a peripheral recess extending inwardly from one side of the wheel and partially across the same, of a collar fitting tightly around said wheel, and adapted to be held in place by friction, said collar having an interior projection, situated within said recess, and exterior projecting portions upon said collar.

2. A combination with a lawn-mower wheel, having a peripheral recess extending inwardly from one side thereof, and partially across the wheel, and communicating with a transverse socket at its inner end, of a collar fitting tightly around said wheel, and adapted to be held in place by friction, said collar having an interior projection, adapted to enter the open end of said recess and to pass therethrough to and into said socket, and exterior projections upon said collar.

In witness whereof I have hereunto set my hand this 31st day of December, 1903.

WILLIAM H. OGDEN.

Witnesses:
 HUGH SWEENEY,
 SAMUEL K. FISHER.